J. K. HOSAKA.
AUTOMATIC ADVERTISING DEVICE.
APPLICATION FILED AUG. 19, 1908.
930,963.
Patented Aug. 10, 1909.
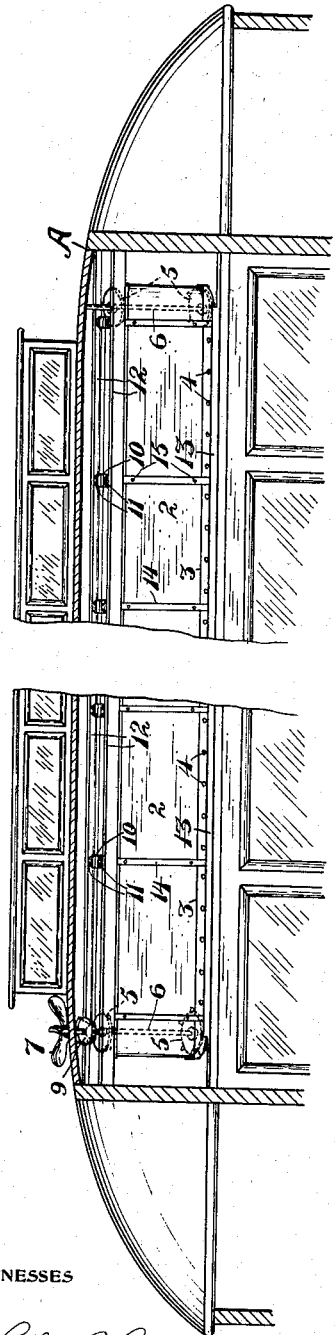
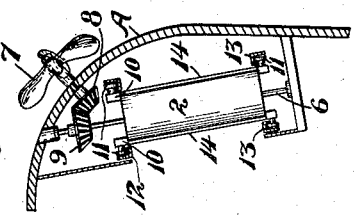
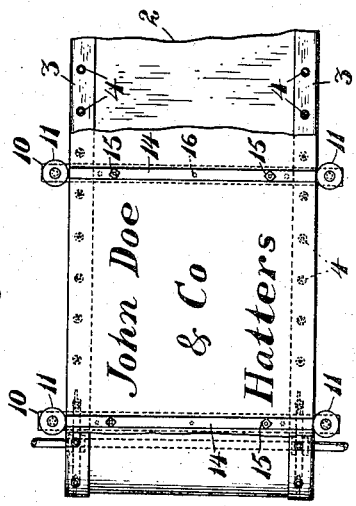
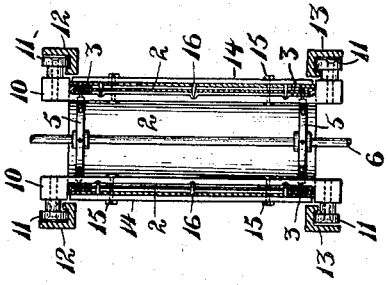
WITNESSES
INVENTOR
James K. Hosaka
BY Geo. H. Strong,
ATTORNEY

UNITED STATES PATENT OFFICE.

JAMES K. HOSAKA, OF SAN FRANCISCO, CALIFORNIA.

AUTOMATIC ADVERTISING DEVICE.

No. 930,963.    Specification of Letters Patent.    Patented Aug. 10, 1909.

Application filed August 19, 1908. Serial No. 449,256.

*To all whom it may concern:*

Be it known that I, JAMES K. HOSAKA, citizen of Japan, residing in the city and county of San Francisco and State of California, have invented new and useful Improvements in Automatic Advertising Devices, of which the following is a specification.

My invention relates to an advertising device, and pertains especially to an automatic advertisement displaying device for use in street-cars and the like.

Its object is to provide a simple, cheap, practical device for displaying advertisements, which can be simply operated, and which will be novel in its operation, and interesting to the occupants of the car or other vehicle or place in which the apparatus is operated.

The invention consists of the parts and the construction and combination of parts as hereinafter more fully described and claimed, having reference to the accompanying drawings, in which—

Figure 1 represents a portion of a car, showing the application of my device. Fig. 2 is a transverse section of my device. Fig. 3 is a side elevation, part of which is broken away. Fig. 4 is an edge view showing the wind motor and its connections.

A represents a car to which the invention is applied. The invention comprises an endless belt 2 running lengthwise of the car and preferably along the incline of the roof thereof, or between the roof and sides, and if desired, one of these belts may be on each side of the car. The belts are preferably of fabric reinforced along their edges with leather, if desired, as shown at 3, with the reinforced edge perforated at intervals, as at 4, whereby these perforations fit the teeth of suitable sprockets 5 arranged on inclined shafts 6. These shafts are suitably journaled and any appropriate means are employed to revolve one or both of them, whereby motion may be imparted to the belt A.

A simple and economical means of operating the belt is by a wind motor or wheel 7 arranged outside of the car and having its shaft provided with a bevel gear 8 on its inner end meshing a corresponding gear 9 on one or other of the shafts 6. If desired, a wind motor may be connected with each of the sprocket shafts 6.

The advertisements or other display placards are suitably secured on the surface of the belt, preferably by the following means: The inside surface of the belt is provided with the cross-bars 10 which extend above and below the belt, and carry at their ends the laterally supported rollers 11 running in suitable upper and lower guide channels 12—13. These cross-bars 10 are secured to the belt by any suitable means, and are disposed at a distance apart corresponding to the width of an advertisement. The front side of the belt, or that which is presented to view, removably carries the clamp bars or slats 14 corresponding to the rear bars 10, and it is between the bars 10 and the front slats 14 that the advertisement is clamped; the bars 14 being held to the belt and to the backing bar 10 by suitable means, as the screws 15. If desired, the clamp bar 14 may have projections 16 to pierce the advertisement and hold the same in place. Whenever the car moves sufficient to operate the wind motor 7, the belt is made to move, and each advertisement is brought successively into view of every passenger in the car, and entertainment thereby provided for the passengers.

It is manifest that any form of power may be employed to operate the belt or belts.

The perforated flexible border 3 of the belt is preferred, to give lightness thereto, and the placards or sheets on which the advertisements are displayed are preferably of light, flexible, tough material which will not tear readily but which will easily pass around the sprockets at the ends of the belt.

Having thus described my invention, what I claim and desire to secure by Letters Patent is—

The combination with a car, of an endless belt running lengthwise of the car and along the inclined side of the roof thereof, said belt being composed of fabric, reinforced along its edges, and said edges perforated, inclined shafts at the ends of the car, sprockets on said shafts having teeth fitting said perforations in the belt, means for driving the belt, and means carried by the belt for holding advertising cards, said means including cross-bars arranged at suitable intervals and extending above and below the belt, guide rollers at the ends of said cross bars, channels above and below the belt, said guide rollers running in said channels, clamp bars on the exposed surface of the belt, said clamp bars having projections to penetrate the belt, and means for securing the clamp bars to the cross-bars.

In testimony whereof I have hereunto set my hand in presence of two subscribing witnesses:

JAMES K. HOSAKA.

Witnesses:
S. Z. GOTO,
M. N. KABAYASLK.